United States Patent Office 2,921,485
Patented Jan. 19, 1960

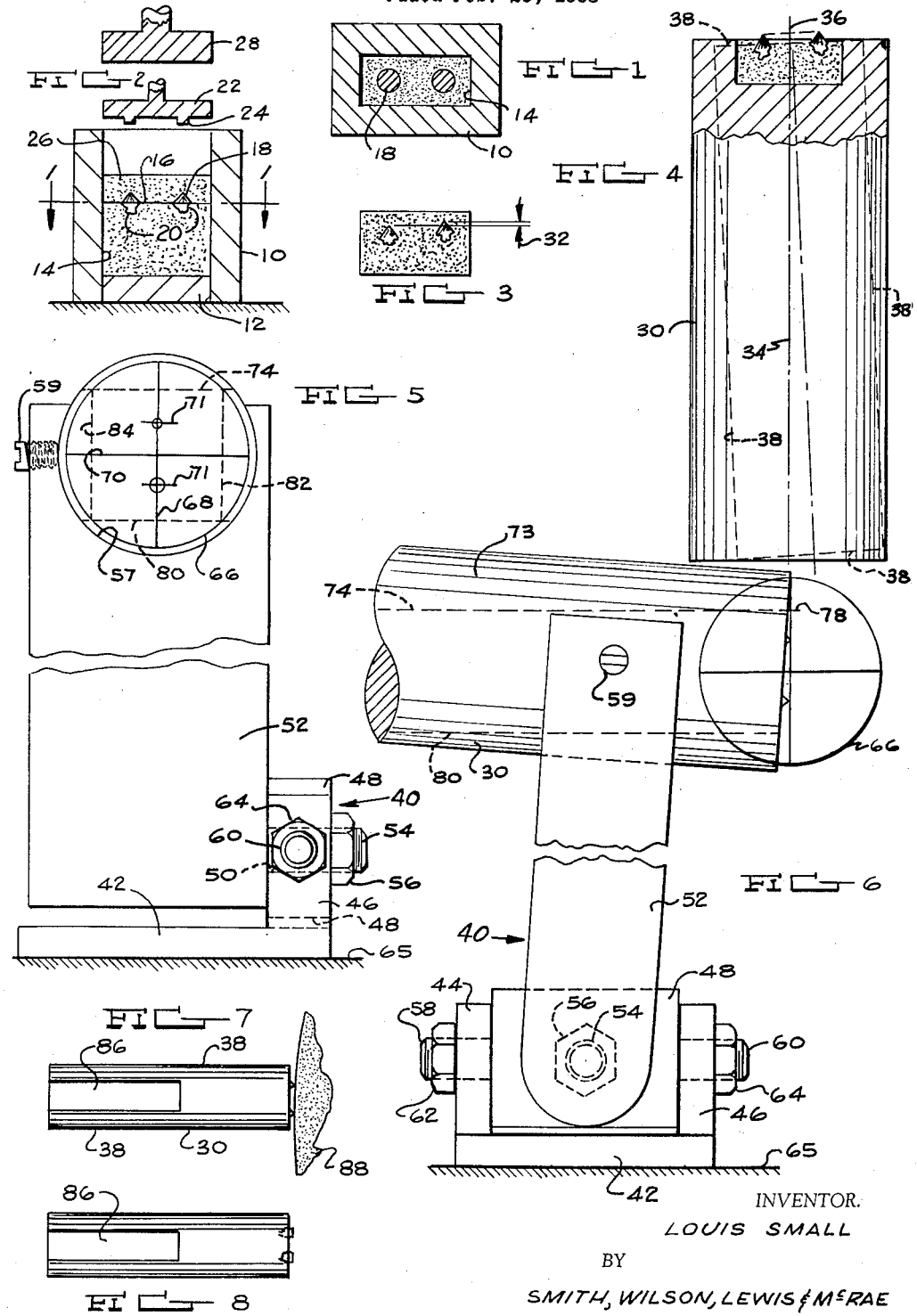

2,921,485

METHOD OF FORMING A DIAMOND TOOL

Louis Small, Detroit, Mich., assignor to Service Diamond Tool, Ferndale, Mich., a company of Michigan Application February 25, 1958, Serial No. 717,431

2 Claims. (Cl. 76—101)

This invention relates to a method of accurately forming a diamond tipped cutting tool so as to cause the diamonds to follow one behind another in precisely the same cutting track along the work. The invention has particular application in diamond tipped tools used for dressing grinding wheels.

In the dressing of grinding wheels it has been found that superior results are obtained if the diamond tipped dressing tool is of such construction that each of its diamonds engaged the wheel in the same cutting track. In this manner each diamond is required to do only a portion of the cutting. In a typical dressing operation the total cut is usually about .001 inch in a single pass over the wheel. By utilizing a dressing tool having two diamonds arranged to follow in the same cutting track each diamond is required to take a cut of only .0005 inch; in this manner the wear on each diamond has been found to be materially reduced because of better cooling and materially less strain on the diamond structures.

The small cut taken by each diamond is also advantageous because of the superior surface characteristics which are imparted to the grinding wheel. With the small cuts the diamonds have a true "cutting" action on the grinding wheel particles as opposed to the "crushing" action which is obtained with larger cuts. The objectionable crushing action tends to give the grinding wheel a "glazed" finish which does not present the required number of tiny cutting edges necessary to satisfactory grinding wheel performance.

The above-mentioned advantages are made possible only by so designing and constructing the dressing tool that (1) the two diamond tips follow behind one another in precisely the same cutting track along the work, (2) the two diamonds each take substantially the same depth cut into the work, and (3) the two diamonds engage the work with substantially the same contact pressure so as to minimize and evenly distribute strain to the two diamonds.

Objects of the present invention are to provide a method of manufacturing a diamond tipped cutting tool having the three above-described advantageous characteristics.

Other objects of this invention will appear in the following description and appended claims, reference being had to the accompanying drawings forming a part of this specification wherein like reference characters designate corresponding parts in the several views.

In the drawings:

Fig. 1 is a sectional view on line 1—1 in Fig. 2.

Fig. 2 is a sectional view through a mold structure used to form a diamond-matrix assembly employed in practicing the present invention.

Fig. 3 is a sectional view of the compressed diamond-matrix assembly formed in the Fig. 2 mold.

Fig. 4 is a view showing the Fig. 3 assembly cemented into a tool body.

Fig. 5 is an elevational view showing a fixture employed in the invention to permit optical adjustment of the tool body with respect to the "line of tracking" of the two diamonds.

Fig. 6 is a view showing the Fig. 5 fixture turned tool body ninety degrees from its Fig. 5 position for facilitating an accurate machining of the tool body in predetermined planes to form a tool body having its axis accurately located with respect to the cutting tips of the diamonds.

Fig. 7 is a view showing the Fig. 4 cutting tool after machining to its final shape.

Fig. 8 is a view showing a second cutting tool formed in accordance with the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In Fig. 2 of the drawings there is shown a mold body 10 including a removable "knockout" wall 12 for defining a rectangular mold cavity 14. In the use of the Fig. 2 mold a predetermined quantity of powdered metal (as for example, that disclosed in U.S. Patent 2,254,549) is poured into cavity 14 to a level 16. Then two "conically surfaced" diamonds 18 are inserted into small depressions 20 formed in surface 16. Depressions 20 may be conveniently formed by a manually-actuated tamping "tool" 22 having "bulges" 24.

After diamonds 18 are positioned within depressions 20 a second layer of powdered metal 26 is poured evenly over the diamonds, and large downward pressures in excess of two tons are applied to the powdered metal by hydraulic ram 28 so as to form the compacted brick shown in Fig. 3. This brick is then sintered in a closed furnace as described in U.S. Patent 2,254,549 to form a hard dense matrix structure having the two diamonds firmly embedded therein. The sintered structure is thereafter brazed in a cylindrical tool body 30 and machined to expose the conical diamond tips as shown in Fig. 4.

It will be noted from Fig. 4 that the two diamond tips project different distances from the end face of the tool body (as indicated by spacing 32 in Fig. 3). This difference in "tip projection" is due to variations in flow of the powdered metal taking place during the application of hydraulic pressure to ram 28. During compacting of the powdered metal in mold cavity 14 some areas of the powdered mass are compacted to a greater extent than other areas, with a consequent shifting in the relative positions of the diamonds (as indicated by spacing 32).

The design of the Fig. 4 tool is such that when the tool is positioned adjacent the cutting surface of a grinding wheel (as shown in Fig. 7) the two diamonds will each take equal cuts in the wheel if the diamond tips are located in a line at right angles to the tool body axis. However, it can be seen that the axis 34 of the Fig. 4 tool body is not located at right angles to an imaginary line 36 running between the diamond tips. Before the tool can be used to full advantage it is therefore necessary that tool body 30 be machined along lines 38 to make its axis run normal to imaginary line 36.

In order to accurately position tool body 30 for effecting the desired machining operations, the tool body is inserted into the fixture indicated generally by numeral 40.

Fixture 40 includes a flat base structure 42 having two upstanding arm portions 44 and 46. Rotatably positioned between the two arm portions 44 and 46 is a flat-faced body member 48 provided with a through bore 50. A tool-holding member 52 carries a stud 54 which projects through bore 50 into mesh with a locking nut 56. Member 52 is provided with a cylindrically shaped seat 57 for reception of tool body 30. A set screw 59 serves to lock the tool body in desired positions of adjustment within seat 57.

Body member 48 is provided with two studs 58 and 60 which project through bores in arm portions 44 and 46. Nuts 62 and 64 mesh with the last mentioned studs to lock member 48 in adjusted positions relative to base structure 42.

In the use of fixture 40 base structure 42 is positioned on a flat horizontal surface 65 with tool body 30 held within member 52 as shown in Fig. 5. A microscope (not shown) is arranged to have its viewing field 66 located adjacent the diamond tipped end of the tool body. The microscope is positioned with cross hair 68 exactly vertical (i.e. at right angles to surface 65) and with cross hair 70 exactly horizontal.

Rotation of member 48 around the axis of studs 58 and 60 causes tool holder 52 to be moved vertically so as to change the positions of the diamonds 18 relative to cross hair 70. Suitable rotary adjustment of member 48 causes the two diamond tips to be positioned at exactly the same distances from cross hair 70 as shown in Fig. 5. Suitable markings 71 are provided on field 66 to indicate when the diamond tips are located at the desired positions relative to cross hair 70.

Next, by rotating tool body 30 within seat 57 the tips of the two diamonds 18 can be made to exactly align with cross hair 68 as shown in Fig. 5. Set screw 59 is turned to lock body 30 in the desired position within seat 57.

After the Fig. 5 adjustment operations have been performed, base structure 42 is turned at right angles so as to position it in the Fig. 6 position wherein the silhouettes of the two diamonds are located in optical registry with field 66. The tips of the diamonds may be accurately aligned with cross hair 68 by rotating holder 52 about the axis of stud 54 and locking the holder in place with nut 56.

By using fixture 40 as above described the two diamond tips will be caused to be positioned in exact vertical alignment, both when viewed in the Fig. 5 direction and when viewed in the Fig. 6 direction. Additionally the two diamonds will be located the same distances from cross hair 70.

While tool 30 is still held within fixture 40 the fixture may be positioned beneath a grinding wheel (not shown), and a flat cut taken at 73 to form a flat face 74. This flat face will extend exactly normal to an imaginary line connecting the diamond tips. The depth of cut 73 may be controlled by periodically repositioning fixture 40 with the left end of tool 30 located within microscope field 66. When the required amount of material has been removed from tool 30 surface 74 will be aligned with a cross line 78 on the field 66. There will thus be formed a flat face 74 which extends at a predetermined distance above the intersection point of cross hairs 68 and 70.

By rotating tool body 30 in its seat 57 through an angular distance of one hundred eightly degrees the diamond tips can be made to reverse their positions with respect to cross hair 70. Thereafter a flat face 80 can be formed by grinding body 30 along its upper surface. By using a fixture similar to fixture 40 (but having a flat-faced seat in place of cylindrical seat 57) the tool body can be formed with third and fourth flat faces at 82 and 84.

Each of faces 74, 80, 82 and 84 is necessarily the same distance from the intersection point of cross hairs 68 and 70. Additionally each of the faces is located in a plane extending at right angles to the plane of the diamond tips.

After faces 74, 80, 82 and 84 are formed the left end of body 30 may be chucked so as to permit the tool to be machined into a cylindrical configuration. Thereafter a flat face 86 may be formed in tool body 30 to enable it to be accurately positioned in a holder (not shown) with the tips of its two diamonds located in the same cutting track relative to grinding wheel 88.

In the use of tool 30, grinding wheel 88 is powered in a counterclockwise direction, with tool 30 positioned to have its diamonds located directly below one another in the same cutting track. The tool is caused to traverse the wheel into and out of the plane of the paper so as to impart a new cutting surface to the wheel. In a normal dressing operation the wheel will be dressed by making a single traverse of tool 30 across the wheel surface. The total cut is approximately .001 inch, with each diamond taking a cut of about .0005 inch.

The ability of the tool to have its diamonds take equal cuts is due to the fact that the diamonds are arranged in precisely the same cutting track, with the tool axis accurately located with respect to an imaginary line connecting the diamond tips. The desired "tool body-diamond" positionment is obtained by the aforementioned use of fixture 40.

The tool is shown as provided with "conically" surfaced diamonds. However the tool can also be formed with "chisel" shaped diamonds as shown in Fig. 8. The term "precisely formed" as used herein, is intended to comprehend both of these configurations, but not irregular configurations as would be found in natural diamonds. Under the present invention it is proposed to utilize only the "precisely formed" diamonds because such diamonds can be accurately located to be in the same cutting track; the irregular configurations of natural diamonds prevents the natural diamonds from being located precisely in the same cutting track as contemplated by the present invention.

I claim:

1. The method of accurately configuring a multipoint diamond dressing tool for causing the diamonds to engage the work in a single cutting track; said method comprising the steps of mounting two precisely formed diamonds in an elongated tool body with their cutting tips projecting approximately the same distance out of one of the tool body's end faces; positioning the tool body in a fixture having an angularly adjustable tool-holding mechanism; positioning the fixture adjacent a microscope of the type having two right angularly intersecting cross hairs; adjusting the tool-holding mechanism so as to put the silhouettes of the diamond tips in optical registry with one cross hair of the microscope and at equal distances on opposite sides of the other cross hair; and machining the tool body in directions at right angles to said one cross hair while said body is held in the fixture, whereby to form an elongated tool body having its longitudinal axis extending at right angles to an imaginary line connecting the two diamond tips.

2. The method of accurately configuring a multipoint diamond cutting tool for causing the diamonds to engage the work in a single cutting track; said method comprising the steps of mounting two precisely formed diamonds in an elongated tool body with their cutting tips projecting approximately the same distance out of one of the tool body's end faces; positioning the tool body in a fixture having an angularly adjustable tool body-holding mechanism; positioning the fixture adjacent a microscope of the type having two right angularly intersecting cross hairs; rotating the tool body around its longitudinal axis within the tool body-holding mechanism until the diamond tips are in optical registry with one cross hair of the microscope when sighting in directions substantially along the tool body logitudinal axis; adjusting the tool body-holding mechanism so as to put the diamond tips in optical registry with said one cross hair of the microscope when sighting in directions at right angles to the tool body longitudinal axis; adjusting the position of the tool body in directions parallel to said one cross hair to position the diamond tips at equal distances on opposite sides of the other cross hair; and machining the tool body in directions at right angles to said one cross hair while said body is held in the fixture, whereby to form an elongated tool body having its longitudinal axis extending at right angles to an imaginary line connecting the two cutting tips of the diamonds.

References Cited in the file of this patent

UNITED STATES PATENTS

| | | |
|---|---|---|
| 2,141,202 | Wallace | Dec. 27, 1938 |
| 2,254,392 | Petrie | Sept. 2, 1941 |
| 2,435,916 | Windsor | Feb. 10, 1948 |